Patented June 30, 1942

2,288,219

UNITED STATES PATENT OFFICE 2,288,219

WOOL DYESTUFFS OF THE ANTHRAQUINONE SERIES

Klaus Weinand, Leverkusen-I. G. Werk, Germany, assignor to General Aniline & Film Corporation, a corporation of Delaware No Drawing. Application May 3, 1939, Serial No. 271,508. In Germany May 7, 1938

4 Claims. (Cl. 260—373)

This invention relates to new wool dyestuffs of the anthraquinone series.

Sulfonated 1-amino-2-alkoxy-4-arylaminoanthraquinones represent acid wool dyestuffs which dye animal fibers violet shades. In case the alkoxy radical is a group of a higher molecular weight the dyestuffs show a good fastness to washing, whereas when the alkoxy radical is of lower molecular weight the fastness to washing is diminished, but the dyestuffs show a good levelling capacity. The fastness to light of this group of dyestuffs, however, is poor.

I have found that sulfonation of 1-amino-4-arylamino-2-cyclohexyloxy-anthraquinones leads to new wool dyestuffs which dye animal fibers violet shades of good fastness to light. These new compounds contain the sulfonic acid groups in the aryl radicals.

The cyclohexyloxy radical may be substituted by an alkyl, for instance a methyl group. The aryl radical in 4-position may be a phenyl radical, a substituted phenyl radical as, for instance, a tolyl or xylyl radical, an alkoxy phenyl radical, a cyclohexyl-phenyl radical, or a radical of the tetrahydronaphthalene linked with the —NH— group in 4-position by means of the aromatic nucleus.

The manufacture of my new compounds is effectmed by known methods by causing 1-amino-4-arylamino-2-aryloxy-anthraquinones to react with cyclohexanol or an alkyl derivative thereof with the addition of caustic potash or caustic soda or the sodium or potassium compound of the cyclo-aliphatic alcohol used as starting material. Usually the reaction is carried out in an excess of the cyclo-aliphatic alcohol in order to dilute the reaction mixture. The reaction may also be carried out in the presence of any other indifferent solvent as, for instance, pyridine.

The sulfonation of the resulting 1-amino-4-arylamino-2-cycloalkoxy-anthroquinones is carried out in an indifferent solvent as, for instance, benzene, toluol, or nitrobenzene, by means of chlorosulfonic acid at elevated temperatures.

As my new compounds are employed as free acids as well as salts, for instance alkali metal salts, the appended claims are intended to cover the free acids as well as their salts.

The following examples illustrate the invention without, however, restricting it thereto, the parts being by weight:

Example 1

10 parts of 1-amino-4-anilido-2-phenoxy-anthraquinone are introduced into 50 parts of cyclohexanol. Then 2 parts of caustic potash or caustic soda are added at 60–70° C. and the whole boiled to 100–120° C. for one hour. The melt is diluted with 50 parts of ethyl alcohol, whereby the 1-amino-4-anilido-2-cyclohexyloxy-anthraquinone thus formed separates in form of crystals on cooling.

The isolated product is soluble in pyridine with a violet coloration. The sulfonation is carried out by subsequently adding to a solution of the product thus obtained in benezne 1 to 1.5 mols. of chlorosulfonic acid while stirring at water bath temperature. After sulfonation the benzene used as solvent is distilled off with water vapor, whereby the sulfonic acid dissolves and is precipitated with sodium chloride. It is soluble in water with a violet coloration and dyes wool clear violet shades of good fastness properties to light.

Instead of 1-amino-4-anilido-2-phenoxy-anthraquinone there may be used the corresponding p-toluido-, p-anisidino-, or p-cyclohexylanilido-anthraquinone derivative. The products thus obtained yield shades of similar dyeing properties, yet of a bluer coloration.

Example 2

10 parts of 1-amino-4-anilido-2-phenoxy-anthraquinone are introduced into a mixture of 40 parts of pyridine and 10 parts of p-methylcyclohexanol. Then 2 parts of caustic potash or caustic soda are added thereto at a temperature of 60–70° C. and the whole heated to 100–120° C. for one hour. The working up and sulfonation is carried out as indicated in Example 1. The product yields on wool clear shades of a bluer coloration than the product obtainable according to Example 1.

Example 3

10 parts of 1-amino-4-anilido-2-phenoxy-anthraquinone are introduced into a solution of 1 part of sodium in 50 parts of cyclohexanol and heated to 100–120° C. for one hour. The reaction mixture is worked up and sulfonated as indicated in Example 1. It is identical with the product of Example 1.

I claim:

1. The compounds of the following general formula

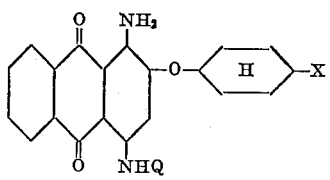

wherein Q is a radical selected from the group consisting of

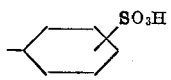

and

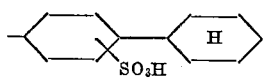

wherein X stands for a member of the group consisting of hydrogen and alkyl.

2. The compound of the following formula

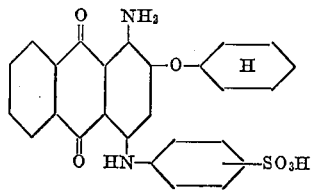

3. The compound of the following formula

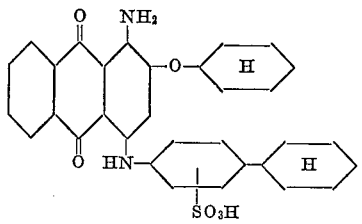

4. The compound of the following formula

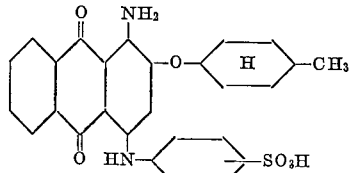

KLAUS WEINAND.